United States Patent
Leigh et al.

(10) Patent No.: US 9,223,097 B2
(45) Date of Patent: Dec. 29, 2015

(54) CONNECTOR INDICIA

(75) Inventors: Kevin B Leigh, Houston, TX (US); George D Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/362,959

(22) PCT Filed: Jan. 31, 2012

(86) PCT No.: PCT/US2012/023278
§ 371 (c)(1),
(2), (4) Date: Jun. 5, 2014

(87) PCT Pub. No.: WO2013/115789
PCT Pub. Date: Aug. 8, 2013

(65) Prior Publication Data
US 2014/0301701 A1  Oct. 9, 2014

(51) Int. Cl.
*G02B 6/38* (2006.01)
(52) U.S. Cl.
CPC ............ *G02B 6/3895* (2013.01); *G02B 6/3879* (2013.01); *G02B 6/3851* (2013.01); *G02B 6/3885* (2013.01); *G02B 6/3897* (2013.01)
(58) Field of Classification Search
CPC .. G02B 6/4249; G02B 6/4224; G02B 6/3851; G02B 6/3869; G02B 6/4256; G02B 6/4228; G02B 6/4227; G02B 6/38; G02B 6/36; G02B 6/3895; G02B 6/3879
USPC ........... 385/71, 52, 53, 54, 55, 56, 59, 65, 77, 385/78, 83, 134
See application file for complete search history.

(56) References Cited

U.S. PATENT DOCUMENTS

| | | | |
|---|---|---|---|
| 5,394,503 A * | 2/1995 | Dietz et al. | 385/135 |
| 5,555,332 A * | 9/1996 | Dean et al. | 385/53 |
| 5,619,604 A | 4/1997 | Shiflett et al. | |
| 6,305,848 B1 | 10/2001 | Gregory | |
| 6,386,767 B1 | 5/2002 | Naghski | |
| 6,623,172 B1 | 9/2003 | de Jong et al. | |
| 6,923,579 B2 | 8/2005 | Fleenor et al. | |
| 2001/0026662 A1 | 10/2001 | Chong | |
| 2004/0120654 A1 * | 6/2004 | Kevern | 385/78 |
| 2005/0031290 A1 | 2/2005 | Shevchuk | |
| 2005/0215119 A1 | 9/2005 | Kaneko | |
| 2006/0045457 A1 | 3/2006 | Ng et al. | |
| 2006/0275007 A1 | 12/2006 | Livingston et al. | |

(Continued)

FOREIGN PATENT DOCUMENTS

| CN | 101960348 A | 1/2011 |
|---|---|---|
| CN | 102043206 A | 5/2011 |

(Continued)

OTHER PUBLICATIONS

International Searching Authority, The International Search Report and The Written Opinion, Oct. 29, 2012, 9 Pages.

*Primary Examiner* — Omar R Rojas
(74) *Attorney, Agent, or Firm* — Hewlett Packard Enterprise Patent Department (57) ABSTRACT

A plurality of connector modules is disclosed. The connector modules have respective various indicia including topside indicia to indicate orientation and ferrule indicia to indicate ferrule position. Ferrules may be removably inserted into the connector modules, and may include seated indicia that indicate if the ferrules are seated.

11 Claims, 5 Drawing Sheets

(56) References Cited

U.S. PATENT DOCUMENTS

2010/0322576 A1* 12/2010 Rhoney et al. ............ 385/134
2013/0094811 A1* 4/2013 Rossman ................... 385/75
2013/0121645 A1* 5/2013 Haley et al. ............... 385/77

FOREIGN PATENT DOCUMENTS

DE 102010020694 A1 11/2011
JP 2002116345 4/2002

* cited by examiner

CONNECTOR INDICIA

BACKGROUND

A system can include multiple electronic devices. To allow communication with the electronic devices, a backplane infrastructure can be provided in the system, where the backplane infrastructure has connectors to connect with respective mating connectors of the electronic devices. The connectors of the backplane infrastructure can include optical connectors to optically connect to respective electronic devices.

BRIEF DESCRIPTION OF THE DRAWINGS

Some examples are described with respect to the following figures.

DETAILED DESCRIPTION

Electronic devices, such as processing devices, storage devices, communications devices, management devices, and so forth, can be mounted in a rack, which includes a frame and other support elements for holding the electronic devices. The rack provides receptacles into which the electronic devices can be inserted. The rack can also include a backplane infrastructure for connection to the electronic devices that have been inserted into the rack. When electronic devices mounted in the rack, connectors on the electronic devices can mate with connectors of the backplane infrastructure. The connectors of the backplane infrastructure are connected to communications media (e.g. optical fibers, electrical wires, etc.) to allow for communication among the electronic devices.

A backplane infrastructure can include optical connectors for optical connection with respective optical connectors of the electronic devices. It is noted that the electronic devices and the connector infrastructure can also include electrical connectors for electrically connecting the electronic devices to the backplane infrastructure. In the ensuing discussion, reference is made to just optical connectors—note, however, that various components discussed below can also include or be substituted with electrical connectors.

In some examples, a backplane infrastructure can include an integrated and fixed arrangement of optical connectors for connection to respective electronic devices. An integrated and fixed arrangement of optical connectors refers to an arrangement in which the optical connectors are affixed to a support structure of the backplane infrastructure such that the optical connectors have to be connected to or disconnected from all electronic devices in a system at the same time. These optical connectors may have multiple ferrules, where each ferrule organizes multiple optical fibers. Generally a ferrule of an optical connector refers to an interface for an optical fiber, where the interface allows for optical communication between the optical fiber and another optical component. The ferrules can be fixed within the optical connector or alternatively may be removably coupled to the optical connector.

The ability to remove and replace various ferrules can present an issue when various ferrules are accessed for service (e.g. to repair of a component) or upgrade (e.g. to replace a component). For example, in a high density optical connector an operator may need to remove and replace multiple ferrules which have designated positions within the connector. The placement of a ferrule improperly may pose problems for the overall system. Additionally, placement of a ferrule into an optical connector such that is not properly seated may also lead to degradation of signals of the system. These problems, when presented to customers or technicians, may be diagnosed improperly leading to repair and/or replacement of costly and properly functioning components (e.g. replacement of an entire backplane).

In accordance with some implementations, a connector infrastructure is provided that has various indicia to enable operators and computing devices to install, reconfigure, and detect issues related to placement of multiple ferrules within an optical connector. "Indicia" as used herein is defined as any distinctive marking, sign, or indication. Examples of indicia may be numbers, symbols, shapes, or textures, among others. The indicia may be affixed to various components and/or integrated with the components (e.g., engraved). In various examples, indicia provided with the connector infrastructure may enable an operator to quickly and properly configure multiple ferrules within a connector, enable a diagnostic computing device to locate and identify specific ferrules (e.g., a damaged, clean, or improperly seated), or enable computing devices to convey relative positions so that additional operations may be done efficiently.

In addition to a connector infrastructure including indicia, in various examples of the present disclosure, a ferrule may also include indicia. Ferrule indicia may enable operators or computing devices (e.g. diagnostic computing devices) to determine whether a ferrule is "seated" within the connector infrastructure. A ferrule is seated within the connector infrastructure when the ferrule enables a fiber optic cable to communicate with an intended component within the mating connector. In this manner, diagnostic computing devices when inserted into a rack, may be enabled to quickly, efficiently, and correctly identify whether various ferrules are properly seated, and in response to an indication that a ferrule is not seated properly, utilize combinations of indicia to convey a relative location of the ferrule.

Figure 1:
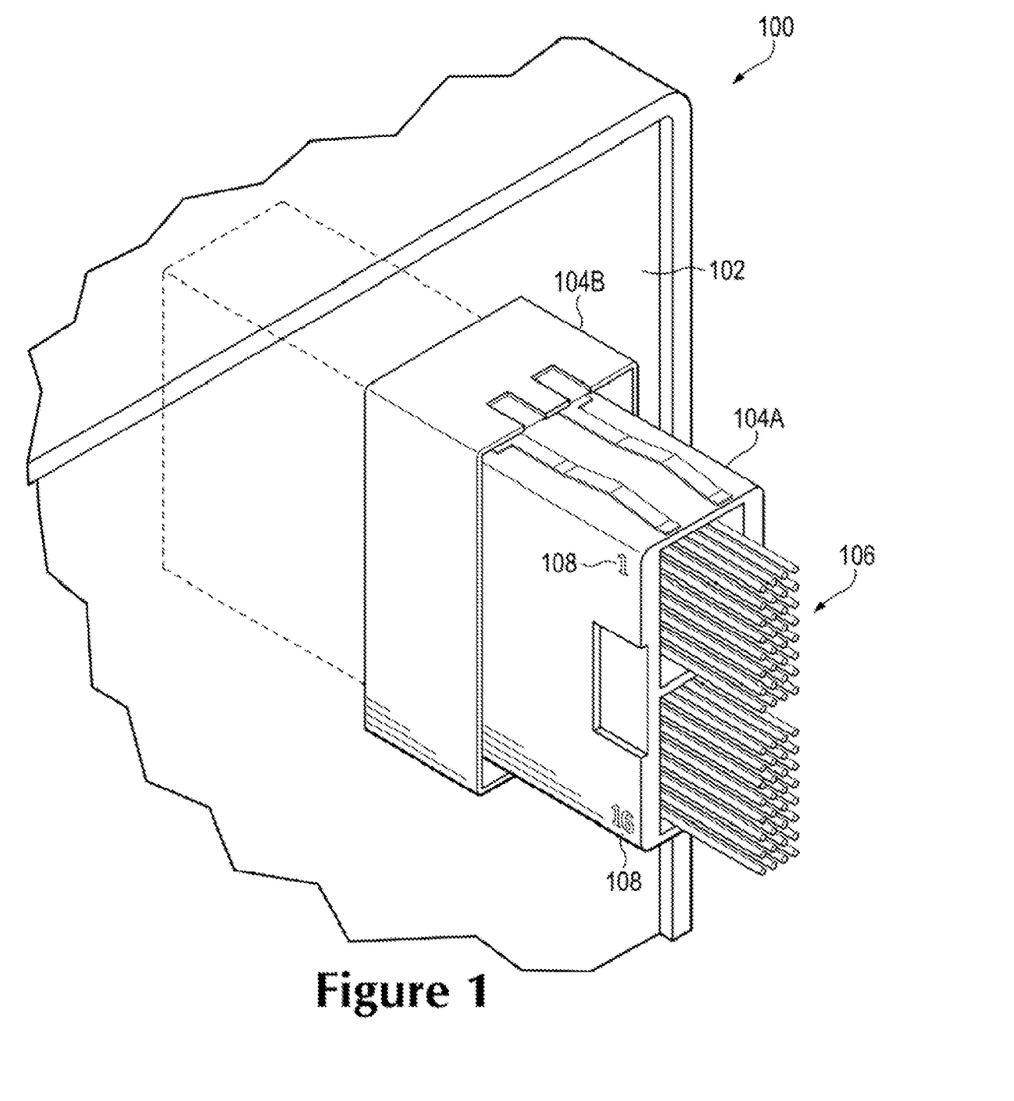
FIG. 1 is a perspective view of a backplane including electronic device connectors according to some implementations.

FIG. 1 illustrates an example system 100 that has a backplane infrastructure 102 that includes a connector 104A-B. The backplane infrastructure 102 and connector module having a first housing 104A and a second housing 1046 that are configured to mate. The mating may couple various electronic devices (not illustrated) that are inserted into receptacles disposed on a chassis housing the backplane infrastructure 102 to each other and to other devices. The electronic devices may be configured to blind-mate with the backplane infrastructure 102. The connector modules 104A-B, as illustrated, are optical connectors that include multiple ferrules that organize optical fibers 106. In the illustration, sixteen ferrules are utilized, each ferrule organizing four optical fibers 106. More or fewer ferrules which may organize more or fewer optical fibers may also be used. In addition, the connector modules 104A-B include indicia 108. Indicia 108 may be disposed in various locations of one or both of connector modules 104A-B.

Figure 2:
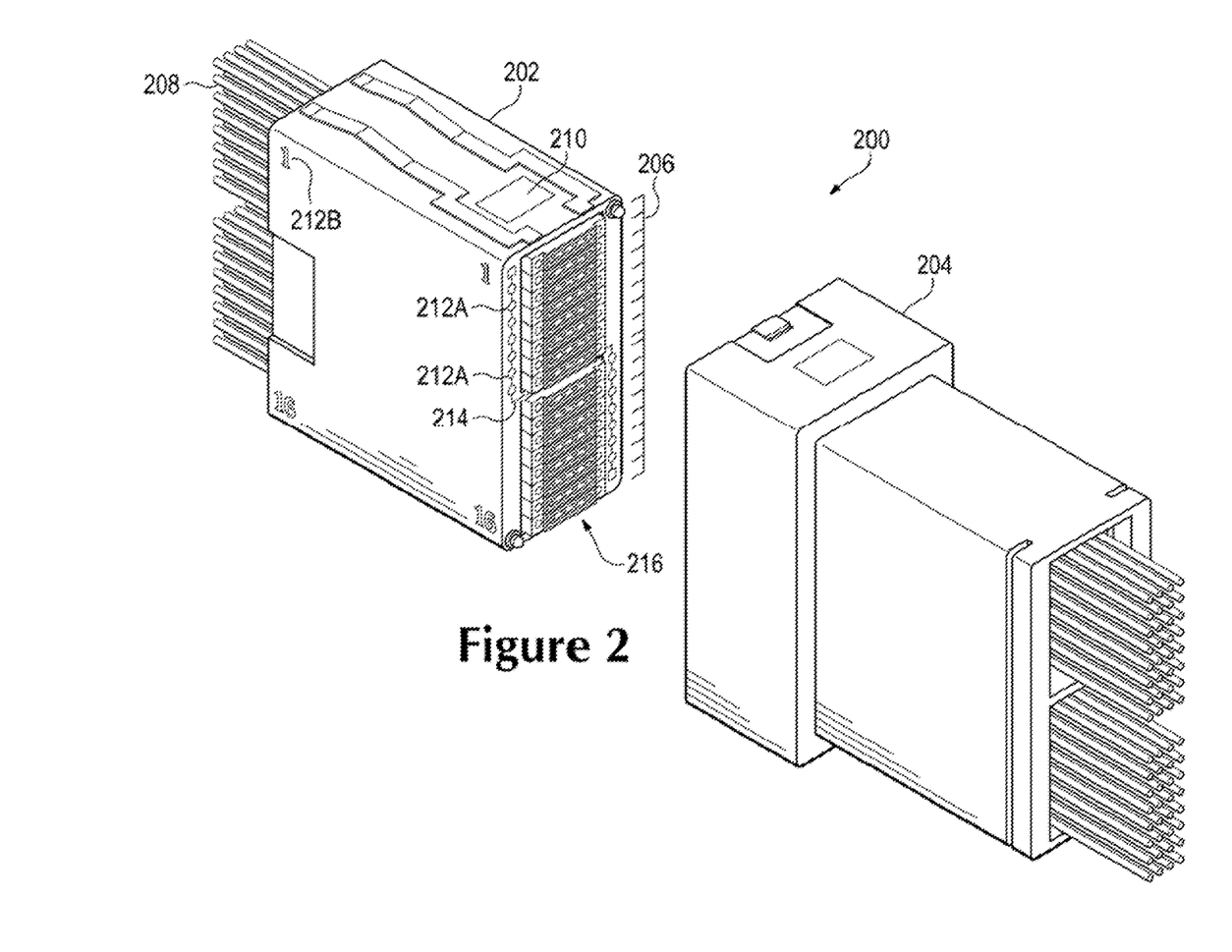
FIG. 2 is a perspective view of a connector module according to some implementations.

FIG. 2 shows a optical connector 200 that has a support frame 202 for connection to a mating support frame 204 of a respective electronic device (e.g. 104 in FIG. 1). A support frame 202 is defined as a structure configured to couple to another optical connector that supports one or more other components. Support frame 202 may also be referred to as a housing. The optical connector 200 further has a plurality of ferrules 206 organizing optical fibers 208 removably coupled to the support frame 202. Although sixteen ferrules are illustrated in FIG. 2, note that there can be different numbers of ferrules 206, each ferrule including different numbers of fiber optic cables 208. Moreover, the optical connector 200 can also include various lenses and other optical components to allow for optical communications.

As further shown in FIG. 2, the connector module 200 includes topside indicia 210 to indicate orientation of the support frame 202 and a plurality of ferrule indicia 212A-B to indicate a plurality of ferrule positions for ferrules 206. In various examples, indicating a topside of the support frame 202 may ensure proper installation with both various electronic devices and various back-planes, while indicating plurality of ferrule positions may enable or facilitate proper installation of various ferrules 208. For example, upon insertion of a ferrule 206 into the support frame 202, a number for the ferrule may be noted. Upon replacement or upgrade of the particular ferrule 206, a user or computing device may be able to quickly and correctly place the corresponding ferrule 206 back into an appropriate position.

The topside indicia 210 and ferrule indicia 212A-B may be disposed in various areas of the support frame 202. For example, ferrule indicia 212A may comprise a plurality of symbols disposed on a front face of the support structure 202 (as illustrated). The symbols may be unique for each ferrule position, or alternatively, may comprise a first symbol corresponding to a first position (square) and a second symbol corresponding to the remaining positions (circles). This may enable a computing device to locate a first position (e.g., the unique ferrule indicia) and iteratively inspect remaining positions. In addition, the plurality of ferrule indicia may comprise direction indicia 214 that indicates a location of a next ferrule 206. Again, such indicia may facilitate identification of respective locations to users, operators, and/or various computing devices. In yet another example, ferrule indicia 212B may comprise a plurality of numerals or letters disposed on a side of support frame 202. Other examples and indicia are contemplated.

As further depicted in FIG. 2, the plurality of ferrules 206 may be removably coupled to the support frame 202 and comprise seated indicia 216. The seated indicia 216, which is illustrated more clearly in other figures to be discussed herein, is configured to indicate whether the plurality of ferrules 206 are seated in the plurality of ferrule positions. As mentioned previously, a ferrule 206 is seated within the support frame 202 when the ferrule 205 enables a fiber optic cables 208 to communicate with an intended component coupled to mating connector 204.

In various examples, seated indicia 216 may comprise a chamfered edge, such that when viewed with respect to other ferrules 206 or a support frame 202, a relative determination of a particular ferrule's seating can be made. Other types of seated indicia 216 may include contrasting colors, such as black and white. In one example, such seated indicia 216 enables a recorder device, such as diagnostic electronic device with a camera, to associate the relative positions of a ferrule 206 in the support frame 202 and the condition of the ferrule 206 and optical fiber 208.

Figure 3A:
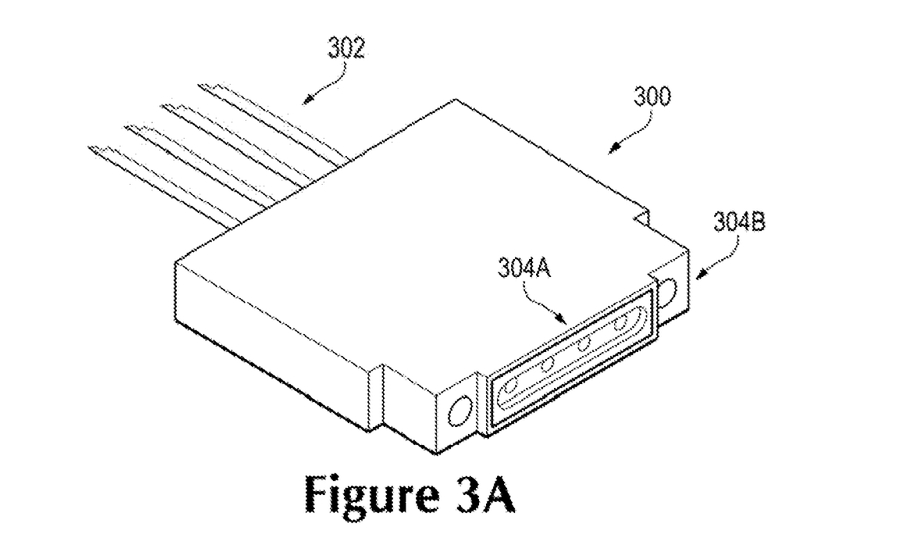
FIG. 3A-B illustrate perspective views of a ferrule and a connector module according to some implementations.

FIG. 3A depicts a singular view of a ferrule 300. The ferrule 300, as illustrated, organizes four optical fibers 302. As stated previously, more or fewer optical fibers may be coupled to ferrule 300. Ferrule 300 includes seated indicia 304A-B. Seated indicia 304A comprise an outline or contrasting color with respect to the ferrule 300 such that a visual inspection by a user or diagnostic device, may be able to determine an improper seated condition relative to other ferrules. Seated indicia 304B includes a stepped edge as described with reference to FIG. 2. Alternatively, a ferrule 300 may include other seated indicia such as, but not limited to, a chamfered edge (not illustrated) along one or more edges of ferrule 300.

Figure 3B:
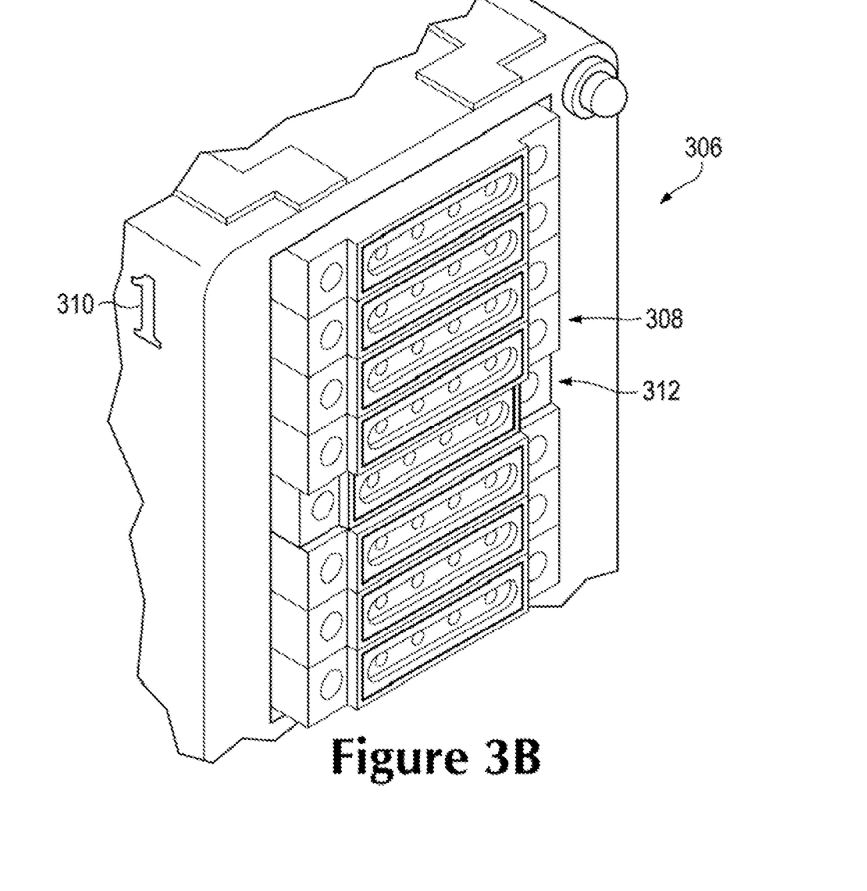

FIG. 3B depicts a connector module 306 generally similar to that of FIG. 2 and including a plurality of ferrules 308 as illustrated in FIG. 3A. Within the connector module 306 are disposed a plurality of removable ferrules 308. Each of the plurality of ferrules 308 is coupled to multiple fiber optic cables as illustrated in FIG. 3A. The plurality of ferrules 308 include seated iodide 304A-B configured to indicate whether the plurality of ferrules 308 are seated in the plurality of ferrule positions indicated by ferrule indicia 310.

In the illustrated example, the plurality of ferrules 308 include an improperly seated ferrule 312. When connector module 306 is coupled with a mating connector (not illustrated), communication transmitted via optical fibers organized by ferrule 312 may experience degradation. In response to lost or degraded data or in response to an inspection, various computing devices or users may first inspect the seated indicia 304A-B and determine that ferrule 312 was inadvertently not seated.

In the illustrated example, the seated indicia 304A-B comprises one or more steps 304B, and contrasting colors 304A on the plurality of ferrules 308. The plurality of steps 304B when properly aligned may form a consistent edge. When seated improperly, as illustrated, the plurality of ferrules 302 and their seated indicia 304B may form an inconsistent edge such as to visually indicate to a user or diagnostic computing device an improper seated condition. In addition, when seated improperly, as illustrated, seated indicia 304A also form an inconsistent appearance relative to other ferrules.

Figure 4:
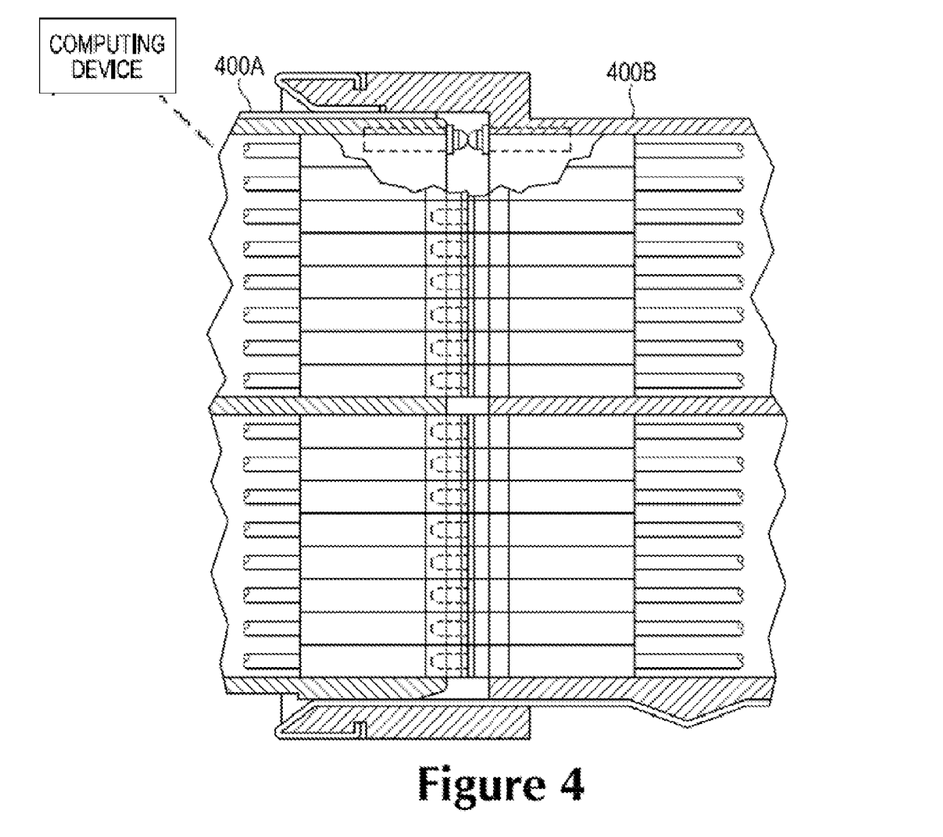
FIG. 4 is a sectional view of a connector module according to various implementations.

In FIG. 4, the connector module 400A is illustrated as being mated with the mating connector 400B. In the mated position, the plurality of ferrules of the connector module 400A are communicatively coupled to the plurality of ferrules of the mating connector 400B such that data may be transmitted through the multiple ferrules and consequently to various electronic devices within the rack.

In one example, an electronic device coupled to the connector module 400A may be a diagnostic computing device (not illustrated). A diagnostic computing device may be inserted into the rack and coupled to a connector module 400A of the rack in order to inspect various components and connectivity among various devices, such as the mating connector 400B. The diagnostic computing device may utilize the plurality of ferrule indicia and the seated indicia to diagnose the connector module 400B.

Figure 5:
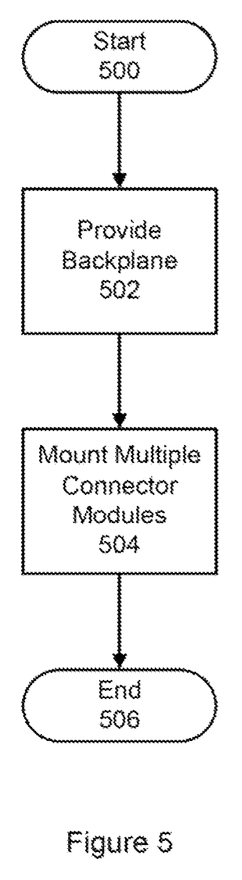
FIGS. 5-6 are flow diagrams according to some implementations.
Figure 6:
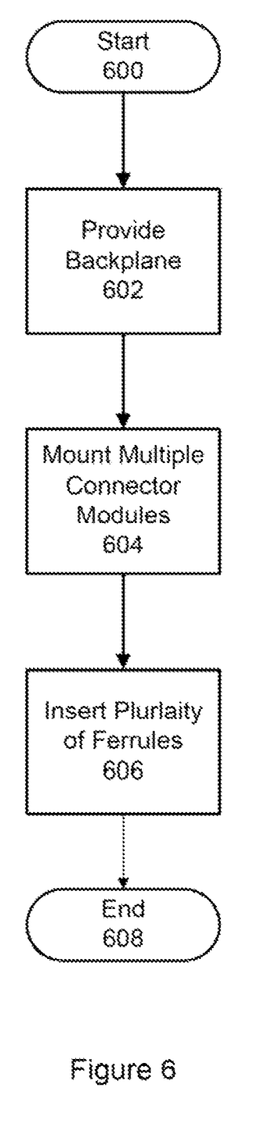

FIGS. 5-6 are flow diagrams of processes of assembling an apparatus or system as discussed above according to some implementations. The processes of FIGS. 5 and 6 can be performed at a manufacturing facility of the connector module 108.

The process of FIG. 5 provides (at 502) a backplane. The process then mounts (at 504) multiple connector modules (e.g. 200 in FIG. 2) to the backplane, wherein the connector modules include topside indicia to indicate an orientation of the connector module and a plurality of ferrule indicia to indicate a plurality of ferrule positions within the connector module.

The process of FIG. 6, provides (at 602) a backplane. The process then mounts (at 604) multiple connector modules (e.g. 200 in FIG. 2) to the backplane, wherein the connector modules include topside indicia to indicate an orientation of the connector module and a plurality of ferrule indicia to indicate a plurality of ferrule positions within the connector module. The process then inserts (at 606) a plurality of ferrules into the connector module, wherein the plurality of ferrules include seated indicia. In various examples, the plurality of ferrules are inserted into the connector module according to the ferrule indicia.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system, comprising:
   a connector, comprising:
      a support frame comprising a topside indicia to indicate an orientation of the support frame and a plurality of ferrule indicia to indicate a plurality of ferrule positions,
         wherein the plurality of ferrule indicia comprises a unique symbol for each ferrule position; and
      a plurality of ferrules removably coupled to the support frame, wherein each of the plurality of ferrules comprise a seated indicia configured to indicate whether the plurality of ferrules are seated in the plurality of ferrule positions; and
   a computing device coupled to the connector to determine a location of one of the plurality of ferrules in response to an indication that the one of the plurality of ferrules is not seated properly.

2. The connector of claim 1, wherein the plurality of ferrule indicia comprise a plurality of numbers.

3. The connector of claim 1, wherein the plurality of ferrule indicia further comprise a direction indicia to indicate a location of a next ferrule of the plurality of ferrules.

4. The connector of claim 1, wherein the plurality of ferrules are correspondingly coupled to a plurality of optical fibers.

5. The connector of claim 1, wherein the support frame and the plurality of ferrules are removably coupled to an optical connector.

6. A system comprising:
   a connector module comprising:
      a support frame comprising a topside indicia to indicate an orientation of the support frame and a plurality of ferrule indicia to indicate a plurality of ferrule positions,
         wherein the plurality of ferrule indicia comprises a unique symbol for each ferrule position; and
      a plurality of ferrules removably coupled to the support frame, wherein each of the plurality of ferrules comprise a seated indicia configured to indicate that the plurality of ferrules are seated in the plurality of ferrule positions; and
   a mating connector coupled to the connector module, the mating connector comprising:
      another plurality of ferrules corresponding to the plurality of ferrules of the connector module, wherein the another plurality of ferrules are communicatively coupled to the plurality of ferrules of the connector module when the plurality of ferrules are seated in the plurality of ferrule positions; and
   a computing device coupled to the connector module to determine a location of one of the plurality of ferrules in response to an indication that the one of the plurality of ferrules is not seated properly.

7. The system of claim 6, wherein the plurality of ferrule indicia comprise a plurality of numbers.

8. The system of claim 6, wherein the plurality of ferrule indicia further comprise a direction indicia to indicate a location of a next ferrule of the plurality of ferrules.

9. The system of claim 6, wherein the computing device is a diagnostic computing device to utilize the plurality of ferrule indicia and the seated indicia to diagnose the connector module.

10. A method of assembling a connector, comprising:
    providing a backplane; and
    mounting a plurality of connector modules to the backplane, wherein the connector modules include topside indicia to indicate an orientation of the connector module and a plurality of ferrule indicia to indicate a plurality of ferrule positions within the connector module,
        wherein the plurality of ferrule indicia comprises a unique symbol for each ferrule position;
    inserting a plurality of ferrules into the connector module, wherein the plurality of ferrules are removable and include seated indicia; and
    coupling a computing device to the plurality of connector modules, the computing device to determine one of the plurality of ferrule positions in response to an indication that a ferrule associated with the one of the plurality of ferrule positions is not seated properly.

11. The method of claim 10, wherein the plurality of ferrules are inserted into the connector module according to the ferrule indicia.

\* \* \* \* \*

UNITED STATES PATENT AND TRADEMARK OFFICE
CERTIFICATE OF CORRECTION

| | | |
|---|---|---|
| PATENT NO. | : 9,223,097 B2 | Page 1 of 1 |
| APPLICATION NO. | : 14/362959 | |
| DATED | : December 29, 2015 | |
| INVENTOR(S) | : Kevin B. Leigh et al. | |

It is certified that error appears in the above-identified patent and that said Letters Patent is hereby corrected as shown below:

In the Drawings

In sheet 5 of 5, reference numeral 606, line 1, delete "Plurlaity" and insert -- Plurality --, therefor.

Signed and Sealed this
Seventh Day of June, 2016

Michelle K. Lee
*Director of the United States Patent and Trademark Office*